United States Patent
Knoerzer

[11] Patent Number: 5,804,905
[45] Date of Patent: Sep. 8, 1998

[54] ELECTRIC DISK ARMATURE MACHINE

[76] Inventor: Karl-Heinz Knoerzer, Im Kleegärtle 7a, DE-79235 Vogtsburg/Achkarren Bundesrepublik, Germany

[21] Appl. No.: 850,589

[22] Filed: May 2, 1997

Related U.S. Application Data

[63] Continuation of Ser. No. 220,898, Mar. 31, 1994, abandoned.

[30]     Foreign Application Priority Data

Apr. 3, 1993  [DE]  Germany ..................... 93 05 152 U
Apr. 3, 1993  [DE]  Germany ..................... 93 95 153 U

[51] Int. Cl.⁶ ...................................................... H02F 1/22
[52] U.S. Cl. ............................. 310/268; 310/42; 310/43; 310/261; 310/264
[58] Field of Search ................................. 310/261, 264, 310/268, 42, 43

[56]             References Cited

U.S. PATENT DOCUMENTS

| | | | |
|---|---|---|---|
| 4,188,556 | 2/1980 | Hahn | 310/268 |
| 4,321,499 | 3/1982 | Gupta | 310/268 |
| 4,438,359 | 3/1984 | Royer | 310/68 R |
| 4,484,097 | 11/1984 | Kanayama et al. | 310/268 |
| 4,501,986 | 2/1985 | Gheolghe | 310/268 |
| 4,510,409 | 4/1985 | Kanayama | 310/268 |
| 4,604,540 | 8/1986 | Fukami | 310/154 |
| 4,806,809 | 2/1989 | Kubota et al. | 310/75 D |
| 4,829,208 | 5/1989 | Uchino | 310/268 |
| 4,949,002 | 8/1990 | Ibe et al. | 310/268 |
| 5,097,167 | 3/1992 | Kanayama et al. | 310/201 |
| 5,144,183 | 9/1992 | Farrenkopf | 310/268 |
| 5,349,259 | 9/1994 | Kaneko et al. | 310/261 |

*Primary Examiner*—Clayton E. Laballe
*Assistant Examiner*—Elvin G. Enad
*Attorney, Agent, or Firm*—Anderson, Kill & Olick, P.C.

[57]                 ABSTRACT

An electric disk armature machine is disclosed which comprises a drive shaft for the transmission of power from and to the rotor of an electric disk armature machine and which has at least one driver disk vertical to the shaft axis for a positive and/or frictional connection with the rotor. The rotor is a self-supporting construction of a plurality of plate-like coil elements which are distributed along the circumference and which are interconnected radially outside and radially inside so as to conduct. The commutator is formed by an annular portion of one end side of the rotor and an insulating layer is arranged between the rotor and the drive shaft. The electric disk armature machine also comprises a rotor which contains a plurality of current conducting coil elements which are turned relative to one another in their radial angular position and which are insulated relative to one another and arranged in one or more different planes vertical to the rotor axis.

33 Claims, 12 Drawing Sheets

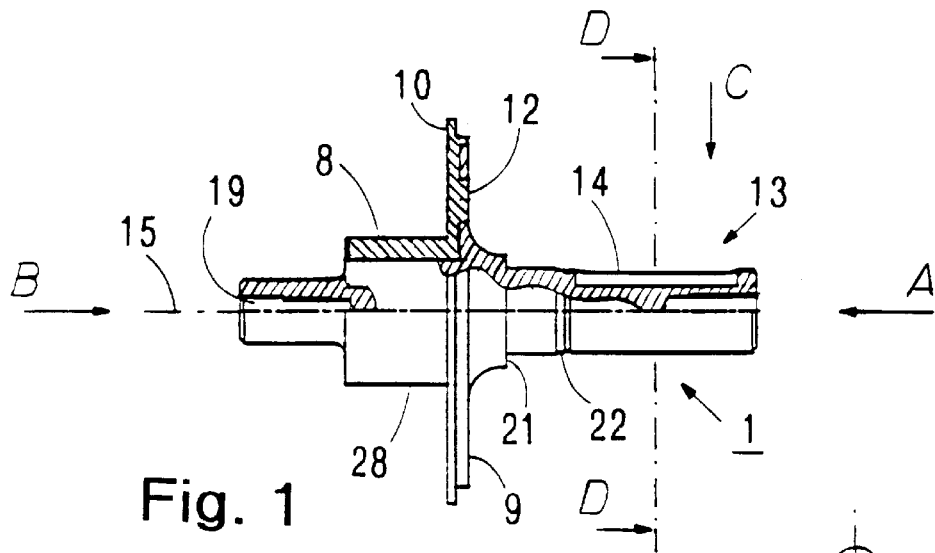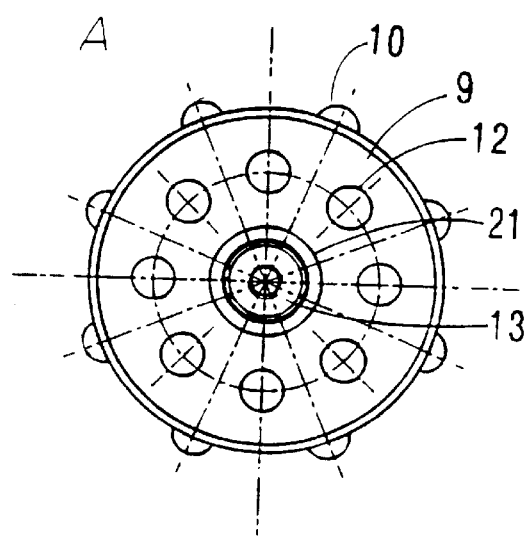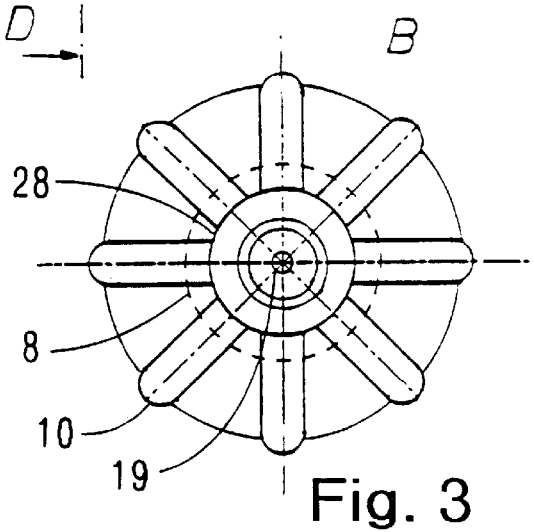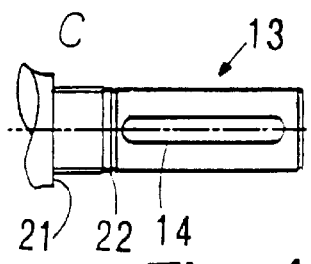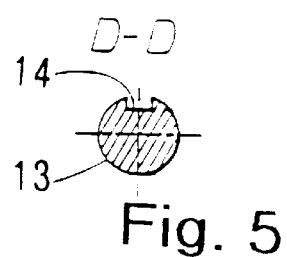

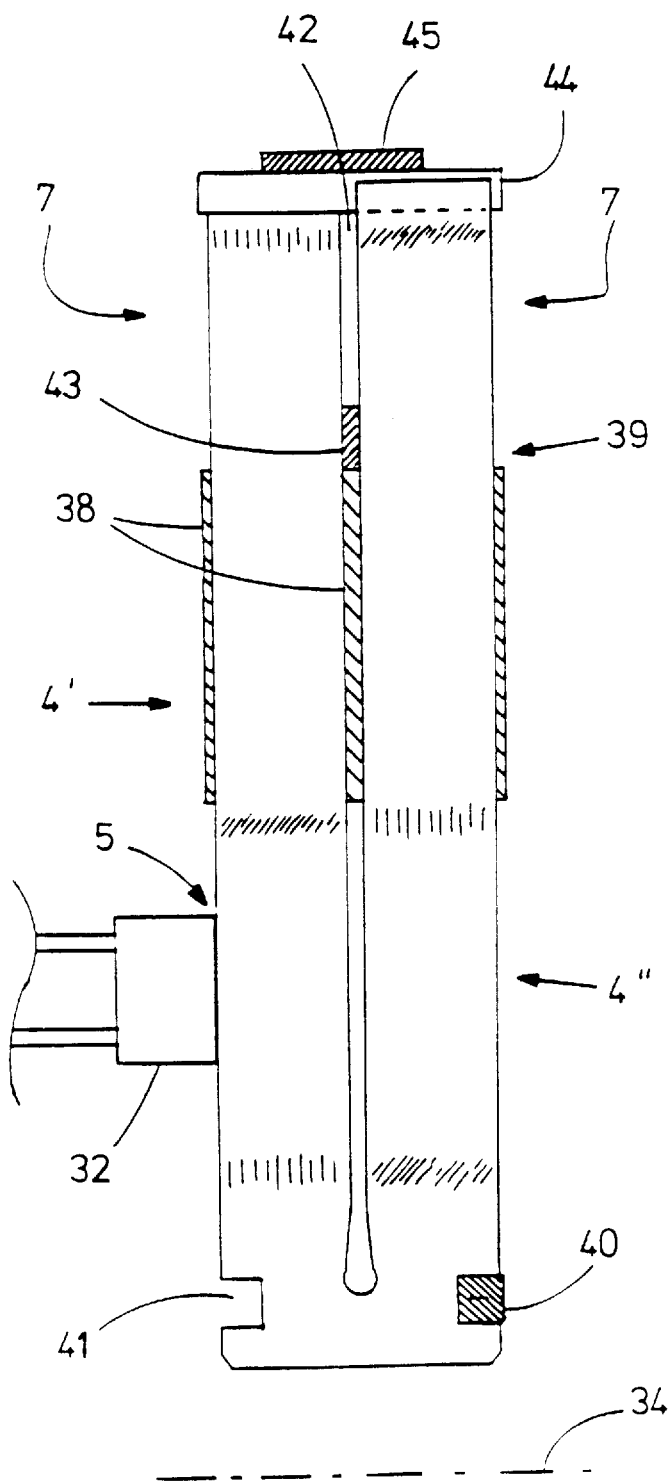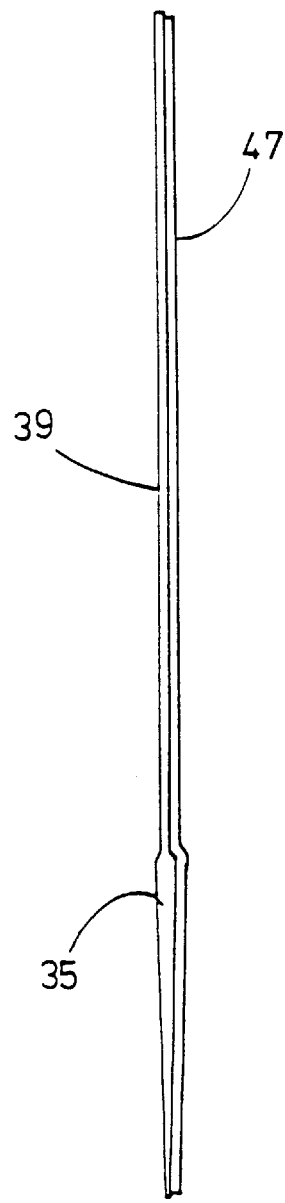
Fig. 19
Fig. 20

ELECTRIC DISK ARMATURE MACHINE

This is a continuation application of application Ser. No. 08/220,898, filed Mar. 31, 1994, now abandoned.

FIELD OF THE INVENTION

The present invention is directed to a drive shaft for the transmission of power from and to the rotor of an electric disk armature machine and to a rotor for an electric disk armature machine.

BACKGROUND OF THE INVENTION

The principle oft an electric disk armature machine is well known (e.g., see C. Clément, "Construction des bobinages électriques" [construction of electric windings], 13th edition, Dunod, Paris, 1942, page 68.

An electric disk armature machine with a drive shaft of the generic type is known from FR-PS 1,232,438. In this prior art patent, the disk-shaped rotor is inserted in a frictionally locking manner into a rotor holder which encloses the drive shaft in the manner of a casing forming another frictional engagement therewith. By reason of the special construction of the rotor of an electric disk armature machine, such as is described in FR-PS 1,232,438, the rotor holder must be made of insulating material so that the rotor forms a self-supporting construction of a plurality of coil elements which are distributed along the circumference. For this reason, the connection between the drive shaft and the coil elements which form the rotor obviously may not be electrically conducting.

This presents two main problems. The frictional engagement between the rotor and the insulator, on the one hand, and between the insulator and the shaft, on the other hand, cannot be realized on a permanent basis, especially with active torques in the order of magnitude of several Newton meters. Further, such a construction, according to the prior art, does not allow a stable movement behavior of the rotor within close tolerances because of the small lateral guiding force of the rotor holder due, in part, to the small contacting surface, and in part, to the material characteristics of conventional insulators. However, disk armature machines require great stability against oscillating movements of the rotor disk in the axial direction so that the magnetic poles of the stator can be advanced as closely as possible to the rotor. The smallest possible distance between the magnetic poles and the rotor is a precondition for good efficiency of the disk armature machine.

A rotor for an electric disk armature machine is known in particular from FR-PS 1,426,280. In this prior art patent, the coil elements of the rotor are formed by suitably shaped, bent, sheet-metal strips which extend along different planes vertically to the rotor shaft. The commutator is formed by the radially inner parts of the radial coil element portions. The brushes contact the flat side of the sheet-metal strips.

However, in a construction according to the prior art, the comparatively large and irregularly shaped gap between the commutator plates causes severe wear of the brushes.

Consequently, electric disk armature machines, according to the prior art, are in need of improvement with respect to brush wear and transmission of power to the drive shaft, especially in the case of relatively high torques, and accordingly, also with respect to the lateral guidance of the rotor movement by the drive shaft.

SUMMARY OF THE INVENTION

The present invention has the object of improving an electric disk armature machine of the generic type with respect to efficiency and resistance to wear. This object is met, according to the invention, by a drive shaft and a rotor which have the features described hereinbelow.

The present invention provides a drive shaft for the transmission of power from and to the rotor of an electric disk armature machine having at least one driver disk vertical to the shaft axis for a positive and/or frictional connection with the rotor. The rotor is a self-contained or self-supporting construction of a plurality of plate-like coil elements which are distributed along the circumference and which are interconnected radially outside and radially inside so as to conduct. The commutator is formed by an annular portion of one end side of the rotor, and an insulating layer is arranged between the rotor and the drive shaft.

Such a driver disk, according to the present invention, can cover a comparatively large area of an end side of the rotor. It thus exerts a high lateral guiding force on the moving rotor. Further, it substantially increases the durability of the rotor/drive shaft connection, particularly in the event of torques of several Newton meters.

A permanent, frictional connection between the rotor and the drive shaft can be provided in spite of the intervening insulating layer in that, for example, two driver disks, according to the present invention, are clamped against one another at the two end sides of the rotor. The forces at the connecting surface, between the driver disk and the rotor, may be maintained within manageable limits when the dimensioning of the driver disk is sufficiently large.

A positive-locking connection between the driver disk and the rotor results in a greatly improved transmission of power. In this manner, even high torques can be transmitted easily. A suitable dimensioning of the parts of the driver disk and the rotor, which mesh in a positive engagement, offsets the negative impact of an intervening insulating layer which may have poor dimensional stability.

A plastic, and in particular a duroplastic, is preferably used as material for the insulating layer. Duroplastics have sufficient dimensional stability and resistance to wear for the production of a positive-locking connection between the driver disk and the rotor even indirectly without a positive-locking meshing of these two parts. A duroplastic of this type is advantageously made of a fiberglass reinforced epoxy resin mixture. A fiberglass-reinforced epoxy resin mixture can be pressed into the casting mold when hot as a rod molding compound and is accordingly easy to work with.

The advantages of such a dimensionally stable insulating layer are particularly apparent when this insulating layer is connected, in a positive-locking manner, with the driver disk by means of protuberances and recesses, on the one hand, and has driver projections which engage in the end side of the rotor, on the other hand. The engagement between the driver disk and the rotor can accordingly be produced indirectly by a very simple process, particularly, when using an epoxy resin mixture which is moldable when hot.

Further advantages result when these driver projections are shaped corresponding to the configuration of the coil element portions in the contacting region of the end side of the rotor. When these coil elements are formed by section plates, for example, the recesses, which are required for receiving the driver projections, can be integrated into the shape of the plate already before the section plates are combined to form a rotor. Accordingly, there is no need for subsequent working on the finished rotor for fitting it with the drive shaft.

There is advisably at least one slot or groove in the circumference of the transmission connection portion of the drive shaft. A simple positive-locking connection with a gear unit or transmission connected to the electric disk armature machine can be produced by means of one or more of such grooves.

When the transmission connection portion of the drive shaft has a tapered or reduced cross section in the region of the groove, which is advisably effected in such a way that the groove is made flush in the region of the cross-sectional reduction, the machine and the transmission can mesh with one another in a simple manner while forming a positive-locking connection.

According to a preferred construction of the present invention, only one driver disk is rigidly connected with the drive shaft. A counterdisk is fastened on the drive shaft so as to be axially displaceable and securable opposite the surface of this driver disk on the rotor side. A press fit can be effected between the driver disk and the rotor and between the counterdisk and the rotor by means of this displaceable counterdisk.

This obviously has an advantageous effect in the frictional connection between the driver disk, the counterdisk and the rotor, but advantages are also achieved in a positive-locking connection of the driver disk and the rotor due to the press fit, in particular, with respect to the lateral guiding characteristics of the driver disk.

The axially displaceable and securable fastening of the counterdisk on the drive shaft can be effected in that an internal thread in the counterdisk engages with a corresponding external thread in the drive shaft.

Alternatively, the counterdisk can be connected with a counterplate which covers the end of the drive shaft on the counterdisk side. A screw which projects into a central bore hole of the drive shaft and which engages in an internal thread therein is countersunk in the counterdisk. Compared to the nut-type fastening of the counterdisk on an external thread of the drive shaft, this has the advantage that the axial displacement of the counterdisk is not contingent on a rotation of the counterdisk for the purpose of achieving the press fit.

The counterdisk is advisably covered by an insulating layer which faces the end side of the rotor. The counterdisk can accordingly also be made of a conductive material, and in particular, metal.

The drive shaft is advisably supported in the stator housing of an electric disk armature machine by means of ball bearings. In so doing, the drive shaft advantageously has at least one bead and/or groove for securing a ball bearing. Accordingly, the guidance of the drive shaft, and consequently, that of the rotor, is secured against axial displacement.

In the embodiment form of the drive shaft according to the present invention, with the counterdisk and the counterplate, it is particularly advantageous that one of the ball bearings is placed between the counterdisk and the counterplate, since tightening the central screw of the counterplate presses the counterplate against the ball bearing, the ball bearing against the counterdisk, and the counterdisk against the rotor. Accordingly, there is no need for separate securing means for the ball bearing, in the form of beads or grooves, on the drive shaft. Should the press fit eventually become loose, e.g. due to fatigue in the insulating layer between the driver disk, the counterdisk and the rotor, it is even possible to make readjustments by tightening the central screw without impairing the lateral guidance due to the support of the drive shaft.

The connection of the drive shaft, according to the present invention, with the stator of an electric disk armature machine, is preferably effected by fitting the ball bearing on the driver disk side into one half of the stator housing and by fitting the ball bearing on the counterdisk side into the brush holder which is connected, in turn, with the other half of the stator housing. In this manner, a stable guidance of the rotor in the stator housing is produced in a simple manner.

The object of the present invention is also met by a rotor for an electric disk armature machine, wherein a plurality of current conducting coil elements, which are turned relative to one another in their radial angular position and which are insulated relative to one another, are arranged in the rotor in one or more different planes vertical to the rotor axis. The coil elements have at least one radial portion which connects an outer coil element portion with an inner coil element portion. At least two coil elements in each instance, can be combined to form a group which is distributed along the circumference of the rotor. Each coil element is connected with the adjacent coil elements of the respective group radially outside and, as the case may be, radially inside so as to be conductive. The commutator is formed by the surfaces of the radially inner coil element portions lying on one of the two end sides of the rotor. The coil element portions of the commutator have conically shaped surfaces so that the edges of the insulating gap, between every two adjacent coil element portions, extend parallel to one another at least in the entire region of contact with the brushes.

This above described construction provides a larger contacting surface between the brushes and the commutator coil element portion, resulting in improved transmission of current and, accordingly, in improved efficiency. Moreover, the parallel configuration of the insulating gap, in the entire contacting region of the brushes, also makes it possible to maintain this insulating gap as thin as possible in the entire contacting region. This substantially reduces the wear of the brushes.

Further, the parallel construction of the insulating gap substantially simplifies the manufacture of the rotor, according to the present invention. The insulating gap is normally routed so as to ensure that the brush exclusively contacts the surfaces of the coil elements. Thus, a parallel insulating gap is naturally simpler to route than an insulating gap having some other shape.

In a preferred embodiment form of the flat rotor, according to the present invention, ferromagnetic material is arranged between the radial portions of the coil elements. Due to its high magnetic susceptibility, this ferromagnetic material guides the magnetic fields between the magnetic poles which are arranged opposite one another in the stator housing, and thus, substantially increases the efficiency of an electric machine in which the flat rotor, according to the present invention, is installed. Dynamo sheets can be used as ferromagnetic material.

Another preferred embodiment form of the flat rotor, according to the present invention, consists in the use of section plates as coil elements. These section plates can be made of copper. The use of section plates enables a simple production process and there is no need for a costly supporting frame for the rotor since the sheets, and accordingly the coil elements, have a high inherent stability.

The centering and the securing of the section plates by one or more clamping rings advantageously increases the stability of the rotor, since the section plates have a relatively considerable inherent weight and are, accordingly, exposed to substantial centrifugal forces during the rotation of the rotor.

One or more grooves are advantageously cut out of the section plates so as to accommodate these clamping rings so that no additional work steps are required for inserting the clamping rings after the assembly of the section plates.

A still greater inherent stability of the rotor is achieved when the section plates are secured by encapsulating or sealing them with a casting resin.

The movement behavior of the rotor is dimensionally accurate or accurate to shape and produces few vibrations due to the high inherent stability. Consequently, the gap between the rotor and the two halves of the stator can be kept small so as to increase efficiency.

The securing of the section plates by clamping rings and/or casting resin is advantageously used to produce the flat rotor, according to the present invention, by means of self-contained or self-supporting section plates, i.e. the rotor body is formed by the section plates in their entirety. These section plates are fixed in position relative to one another without additional supporting members. This results in a considerable decrease in costs of material and construction.

When ferromagnetic material, which normally has a high specific weight, is located between the radial portions of the coil elements, a fiberglass strip is advisably wound one or more times around the entire circumference of the rotor, in the gap between the different radial planes of the coil elements, so as to contact the ferromagnetic material, and is sealed with casting resin for the purpose of a further increase in stability in a self-supporting flat rotor of this type. When cured, the casting resin, together with the fiberglass strip, forms a high-strength connection withstanding the centrifugal forces which act on the ferromagnetic material during rotation.

The flat rotor, according to the present invention, can advisably be used as a disk armature of a permanently excited electric motor. Conversely, the flat rotor, according to the present invention, can also be used advantageously as a disk armature of a permanently excited generator. In particular, when the flat rotor, according to the present invention, is used in an electric machine which serves as a drive assembly or drive unit for a motor vehicle, these electric machines may be used alternately as electric motors and, as the case may be, as generators in a very advantageous manner.

The individual coil elements are advisably soldered or welded radially outside with the respective adjacent coil elements so as to form individual groups of coil elements which are distributed along the entire circumference of the flat rotor. In so doing, a U-shaped section plate is advantageously slid over each solder joint or weld and is soldered or welded together with the latter. This increases the durability of the connection, but serves primarily to produce the connection of coil elements of different radial planes, in a simple manner, when using section plates as coil elements.

The durability and stability of these U-shaped section plate connections, against centrifugal forces, is advantageously increased in that a fiberglass strip is wound radially outside over the entire circumference of the rotor and is sealed with casting resin.

A particularly simple, and therefore, particularly preferred embodiment form of the flat rotor with section plates, according to the present invention, consists in that the section plates are split in width virtually along their entire length so that every two adjacent coil elements which belong to the same group of coil elements, are formed by one and the same section plate. Particularly, when the flat rotor, according to the present invention, has only two radial planes with coil elements, such a feature leads to a very simple production of the rotor in terms of construction. One half of the section plate is associated with one plane of the rotor and the other half is associated with the other plane of the rotor so that there is no need for a separate electrically conducting connection in the radially inner portion of the rotor.

Accordingly, it is an object of the present invention to provide an electric disk armature machine which has all of the above-described advantages.

Other objects and advantages of the present invention will be made evident to those skilled in the art upon a review of the Description of the Preferred Embodiment taken in conjunction with the Drawings which follow.

BRIEF DESCRIPTION OF THE DRAWINGS

In The Drawings:

FIG. 1 illustrates a side view of a drive shaft according to the present invention;

FIG. 2 illustrates a view, in direction A, according to FIG. 1;

FIG. 3 illustrates a view, in direction B, according to FIG. 1;

FIG. 4 illustrates a partial view, in direction C, according to FIG. 1;

FIG. 5 illustrates a view, in section D—D, according to FIG. 1;

FIG. 19 illustrates a view of two associated coil elements as seen vertically to the rotor axis; and FIG. 20 illustrates the basic form of a section plate.

DESCRIPTION OF THE PREFERRED EMBODIMENT

Figure 6:
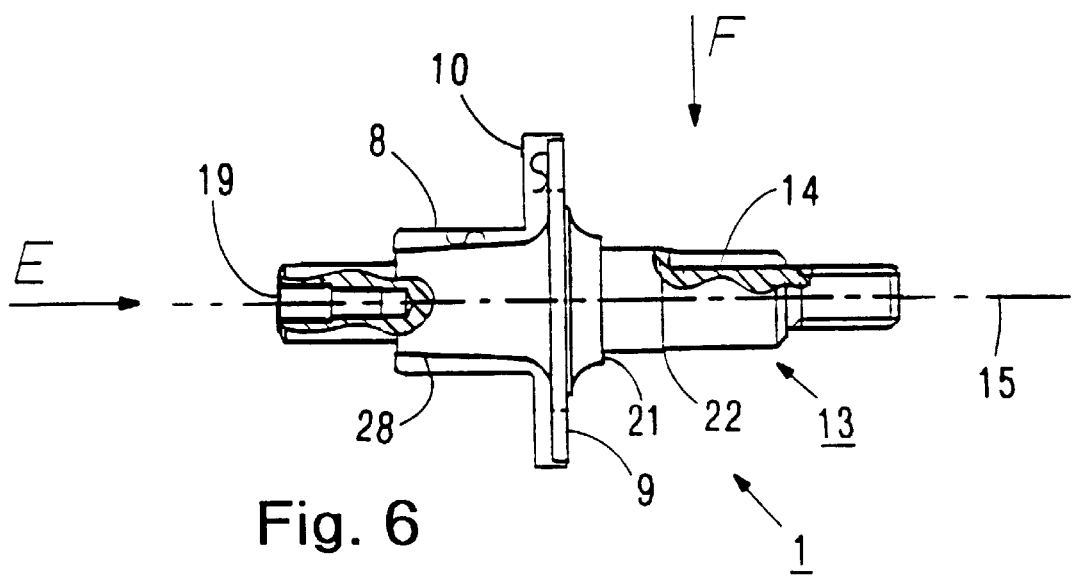
FIG. 6 illustrates a side view of an alternate embodiment construction of the drive shaft of the present invention.

FIG. 1 illustrates a partially sectional side view of a drive shaft 1 according to the present invention. The driver disk 9, which is arranged vertically to the shaft axis 15, is covered, along with the rotor seat 28, by an insulating layer 8. The insulating layer is connected with the driver disk 9 in a positive-locking connection by means of cut-out portions 12 of the driver disk 9. The bead 21 and groove 22 are provided for securing a ball bearing. An axially extending groove 14 is shown in the transmission connection portion 13 of the drive shaft 1.

FIG. 2 illustrates a view in direction A with reference to FIG. 1. The drawing clearly illustrates the bead 21 for securing the ball bearing, the driver disk 9, the circular cut-out portions 12 in the driver disk for the positive-locking connection with the insulating layer 8, and the ends of the driver projections 10 which project out over the driver disk 9 and which are produced from insulating material.

FIG. 3 illustrates a view in direction B with reference to FIG. 1. It will be seen that the driver projections 10 are arranged in a star-like pattern in this embodiment example. Further, the drawing shows the rotor seat 28 on which the insulating layer 8 is indicated. The central bore hole 19 is also shown.

FIG. 4, which illustrates a view in direction C with reference to FIG. 1, further illustrates the manner in which the groove 14 is arranged in the transmission connection portion 13 of the drive shaft 1. The groove 14 serves to receive a positive-locking connection part 5 of the transmission. The drive shaft portion, for receiving the ball bearing, is defined by the bead 21 and the groove 22.

FIG. 5, which illustrates a section D—D, according to FIG. 1, shows another view of the groove 14.

FIG. 6 illustrates a view, which is similar to that of FIG. 1, which illustrates an alternate embodiment example of the drive shaft according to the present invention. In this case, the transmission connection portion 13 of the drive shaft 1 is reduced in cross section in the region of the groove 14 in such a manner that the groove 14 is flush in the region of the cross-sectional reduction. In this manner, the positive-locking connection to a transmission can be effected by a simple attachment. The rotor seat 28 is slightly conical, which is compensated for by the insulating layer 8. The driver disk 9 is connected with the insulating layer 8 in a frictional engagement. The driver projections 10 are shaped like a gear wheel in this embodiment example.

Figure 7:
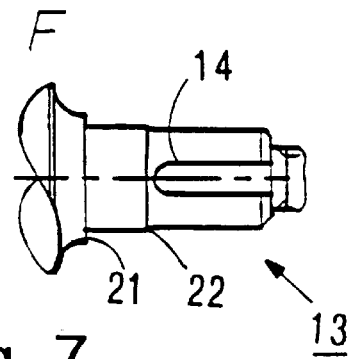
FIG. 7 illustrates a partial view, in direction F, according to FIG. 6.

In a view in direction F with reference to FIG. 6, FIG. 7 again illustrates the seat of the groove 14 and the cross-sectional reduction in the transmission connection part 13, as well as, the seat of a ball bearing between the bead 21 and the groove 22.

Figure 8:
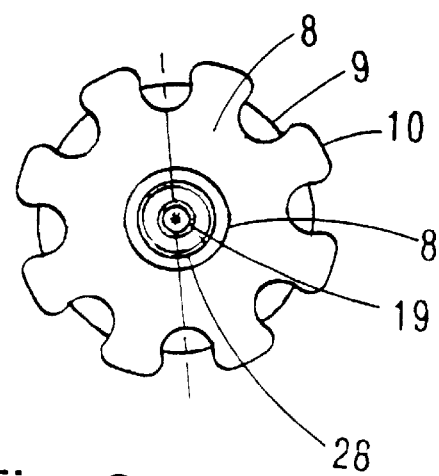
FIG. 8 illustrates a view, in direction E, according to FIG. 6.

FIG. 8 is a view in direction E of FIG. 6 which illustrates the gear-like shape of the driver projections 10 of the embodiment example illustrated therein. In this instance, the driver projections 10 are formed by the insulating layer 8 with their tips projecting beyond the driver disk 9. Also illustrated are the central bore hole 19, the edge of the rotor seat 28, and the edge of the insulating layer 8 in the region of the rotor seat.

Figure 9:
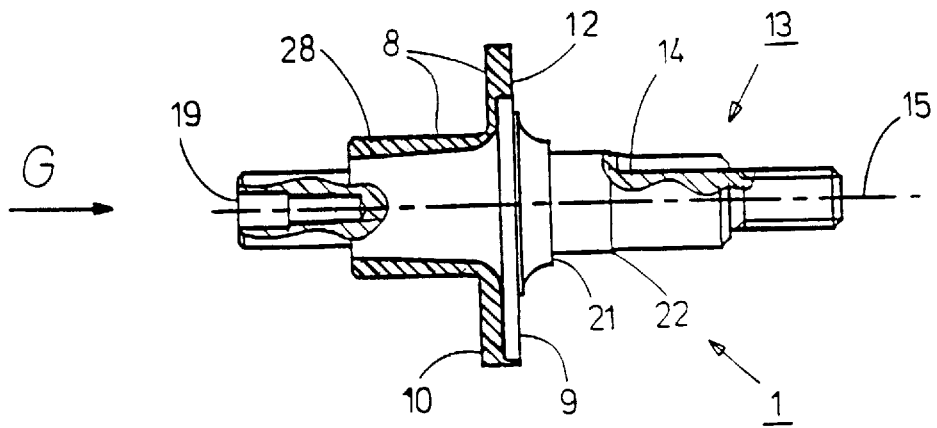
FIG. 9 illustrates a side view of another alternate embodiment form of the drive shaft of the present invention.

FIG. 9 illustrates a side view of yet another alternate embodiment form of the drive shaft 1, according to the present invention. The construction of the transmission connection portion 13 and the rotor seat 28 is identical to that shown in the preceding embodiment example. However, the shape of the driver projection 10 is different. Further, the cut out portions 12 in the driver disk 9, for the positive connection with the insulating layer 8, are different from those in the preceding alternate embodiment example.

Figure 10:
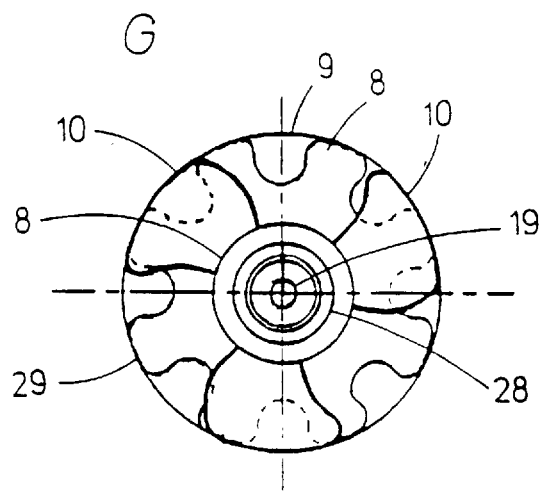
FIG. 10 illustrates a view, in direction G, according to FIG. 9.

FIG. 10, which illustrates a view, in direction G according to FIG. 9, illustrates the above-noted difference. The driver projections 10 are shaped so that they correspond to the configuration of the coil elements of the rotor which engages with them. Further, FIG. 10 illustrates the meshing contour 29 of the insulating layer 8 in the driver disk 9 which is shaped like a gear wheel in this instance. The insulating layer 8 is accordingly connected with the driver disk 9 and with the rotor in a positive connection via the driver projections 10.

Figure 11:
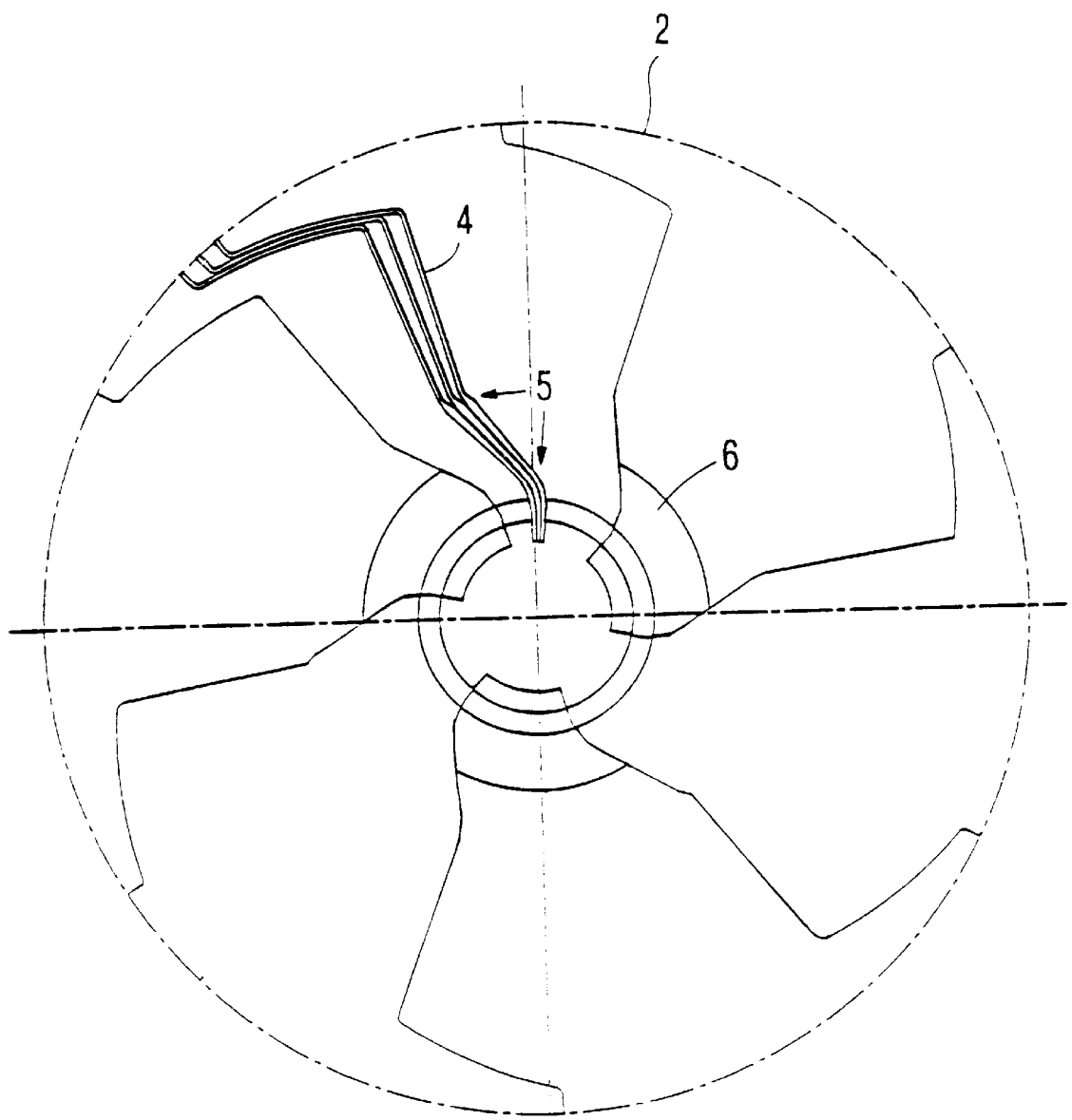
FIG. 11 illustrates a schematic view of an end side of the rotor of the generic type.

The contours of the coil elements 4 of a rotor 2, which fit the driver projections 10, which are illustrated in FIG. 10, are also illustrated in FIG. 11 which illustrates a schematic view of an end side 7 of the rotor.

Figure 12:
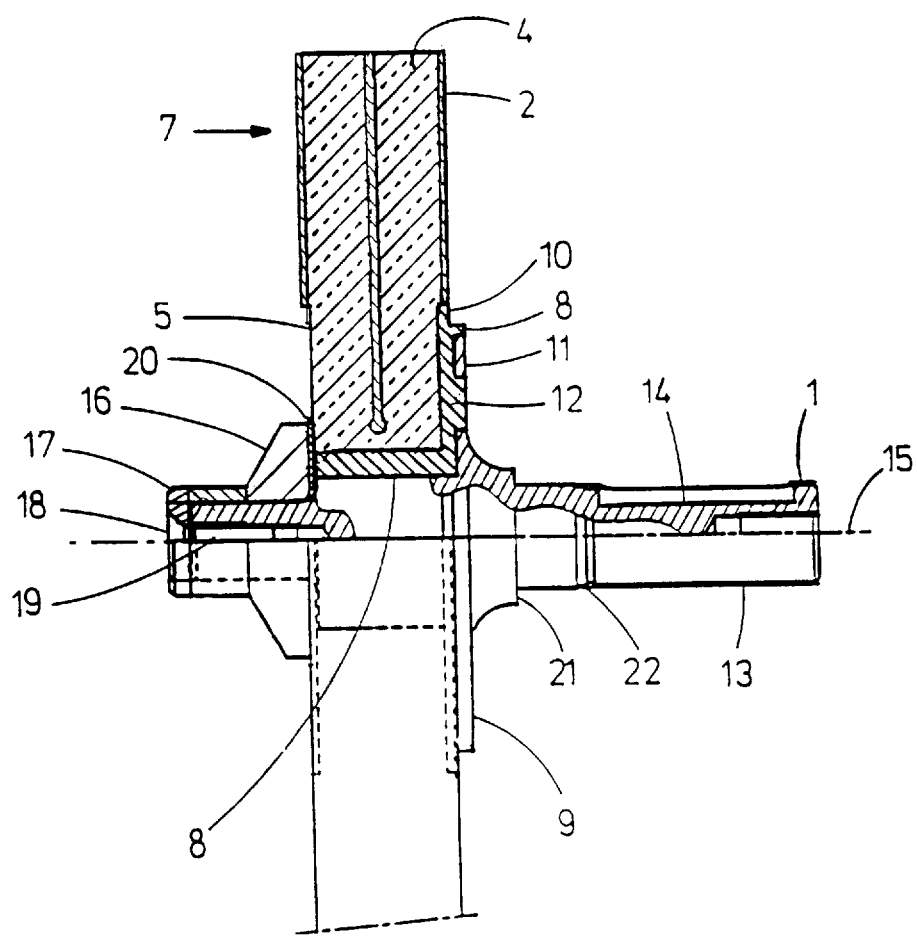
FIG. 12 illustrates a side view of a drive shaft, according to the present invention, including the rotor fastened thereto.

FIG. 12 illustrates a drive shaft 1, according to the present invention, in connection with the rotor 2. In FIG. 12, the torque is transmitted from and to the rotor 2. An insulating layer 8 is arranged on the driver disk 9 and extends vertically to the rotor axis 15. The insulating layer 8 is connected, in a positive engagement, with the driver disk 9 by means of protuberances 11 and recesses 12 in the driver disk 9, on the one hand, and is connected in a positive engagement, with the rotor 2 by means of driver projections 10, on the other hand.

Accordingly, the driver disk 9 is indirectly connected, in a positive engagement, with the rotor 2 or its coil elements 4. The end side 7 of the rotor, which is located opposite the driver disk 9, contacts the counterdisk 16 via an insulating layer 20. The counterdisk 16 is connected, in turn, with a counterplate 17 which is moved toward the rotor 2 by tightening a screw 18 which engages in an internal thread in the central bore hole 19 of the drive shaft 1. Thus, the counterdisk 16 is pressed on the rotor 2 and, accordingly, exerts an indirect contact pressure of the rotor 2 against the driver disk 9 so that the drive shaft 1 is connected with the rotor 2 in a positive and frictional engagement by means of a press fit.

Figure 13:
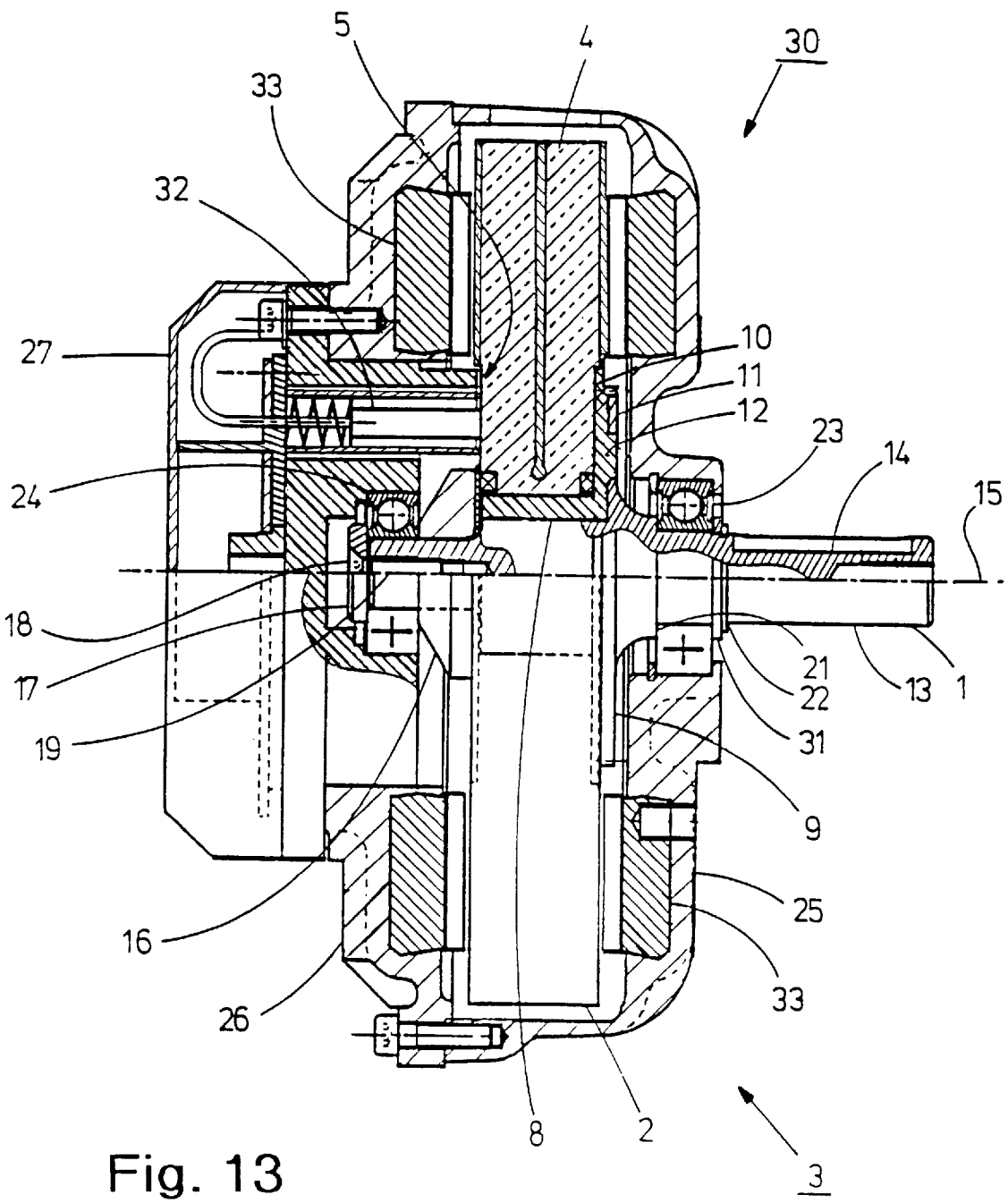
FIG. 13 illustrates a partial section view through an electric disk armature machine of the generic type with a drive shaft according to the present invention.

FIG. 13 illustrates how the drive shaft 1 and the rotor 2 combination, illustrated in FIG. 12, is connected with a stator 30 of a disk armature machine 3 via the ball bearings 23 and 24. Ball bearing 23 is secured by bead 21 and by fastening disks 31, which engage in the groove 22, whereas the ball bearing 24 is clamped between the counterplate 17 and the counterdisk 16. In addition to the features described with reference to FIG. 12, FIG. 13 also illustrates the brush holder 27, with the brushes 32 located therein, which contact the commutator 5 as well as the stator housing halves 25 and 26 with the magnetic poles 33 arranged therein.

Figure 14:
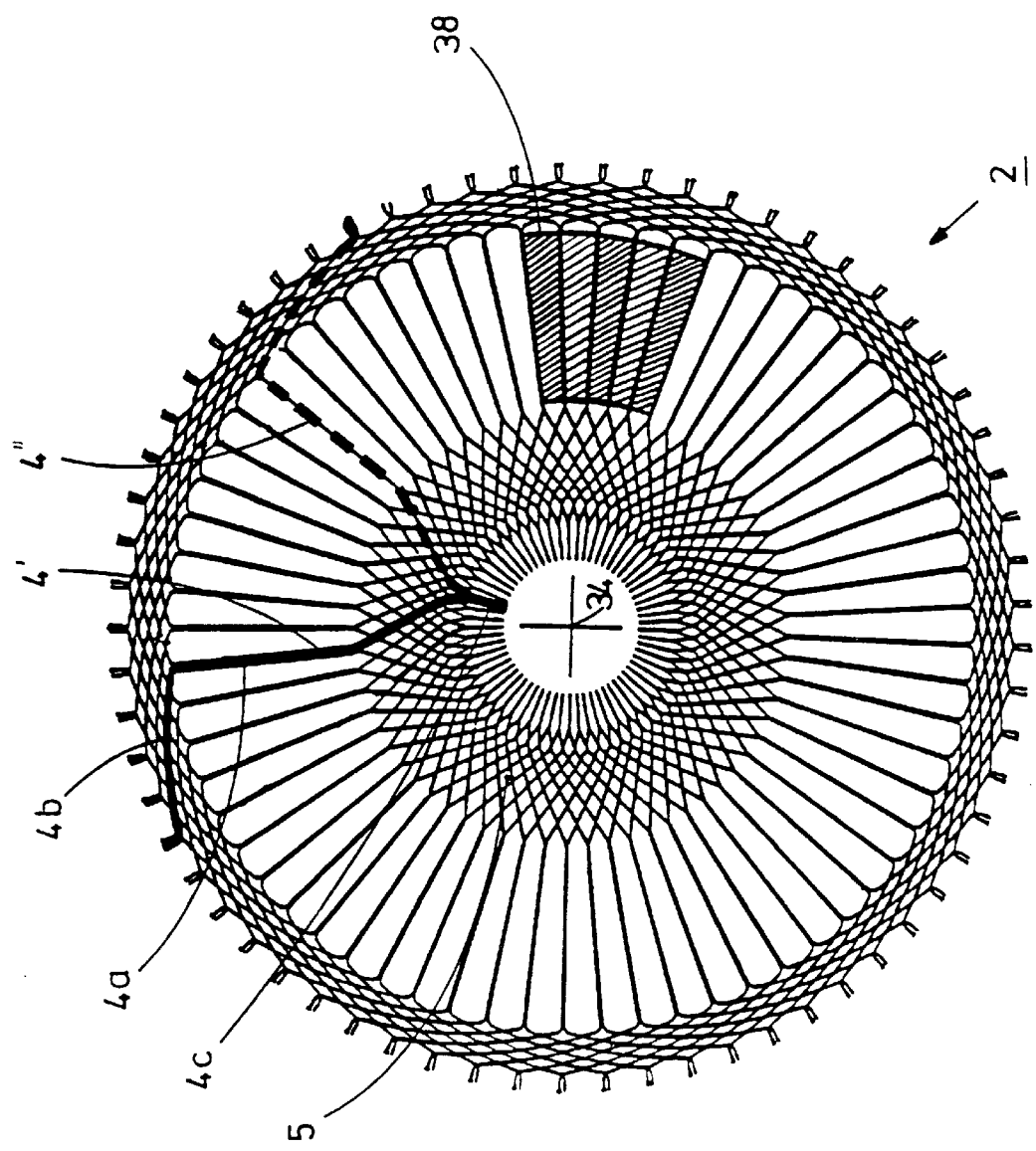
FIG. 14 illustrates a schematic view of an end side of the rotor according to the present invention.

FIG. 14 illustrates a schematic view of a rotor according to the present invention, and in particular, the configuration of the coil elements 4. The coil elements 4 are arranged, in this instance, in two different planes which extend vertically to the rotor axis 34. A first plane is defined by coil elements 4' and a second plane is defined by coil elements 4", which are arranged in an identical, but mirror-inverted, manner.

The coil elements are formed by a radial coil element portion 4a, an outer coil element portion 4b, and an inner coil element portion 4c. The specially designated coil elements 4' and 4" are formed by one and the same section plate and are connected on the radially inner side so as to be conductive. The radially inner coil element portions 4c, in their entirety, form the commutator 5. The ferromagnetic material 38, which is located between the radial coil element portions 4a is shown, by way of example, at five intermediate spaces between the coil elements 4', 4" located in different planes.

Figure 15:
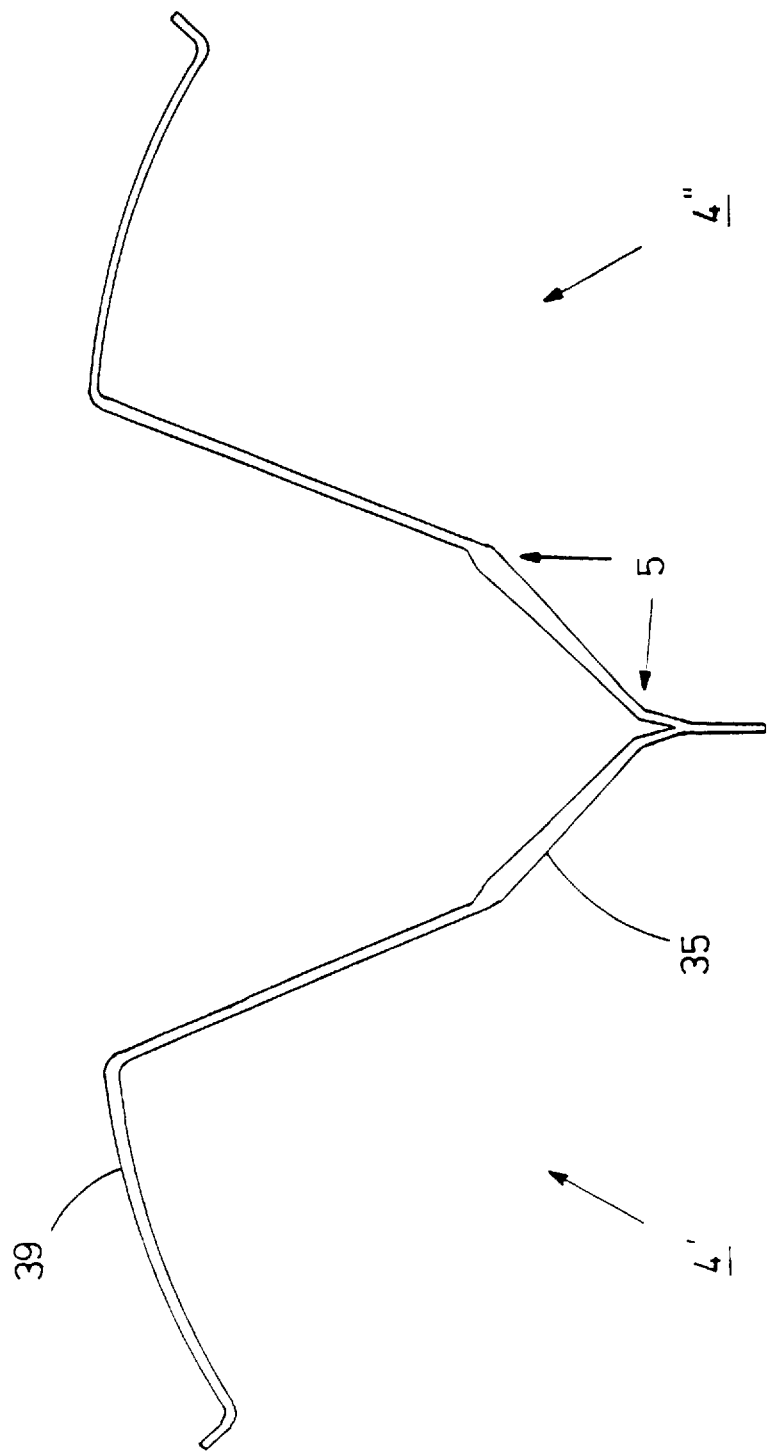
FIG. 15 illustrates two associated coil elements.

FIG. 15 illustrates two associated coil elements 4', 4" which are produced from one and the same section plate 39. The viewing direction is parallel to the rotor axis. Accordingly; the conically shaped surface 35 of the coil element, which is located in the region of the commutator 5, is clearly visible.

Figure 16:
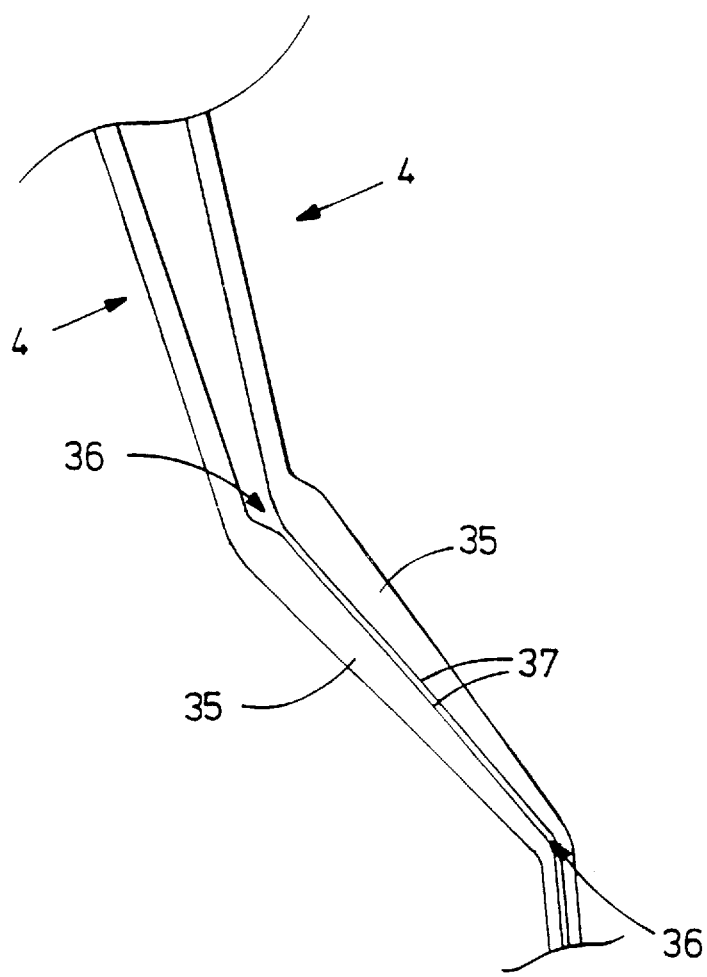
FIG. 16 illustrates a detailed view of the commutator region of two adjacent coil elements.

FIG. 16 illustrates the conical shape of the commutator coil element portions according to the present invention. The conical surfaces 35, of the adjacent coil elements 4, enclose an insulating gap 36 whose edges 37 extend parallel to one another along the entire region of contact with the brushes.

Figure 17:
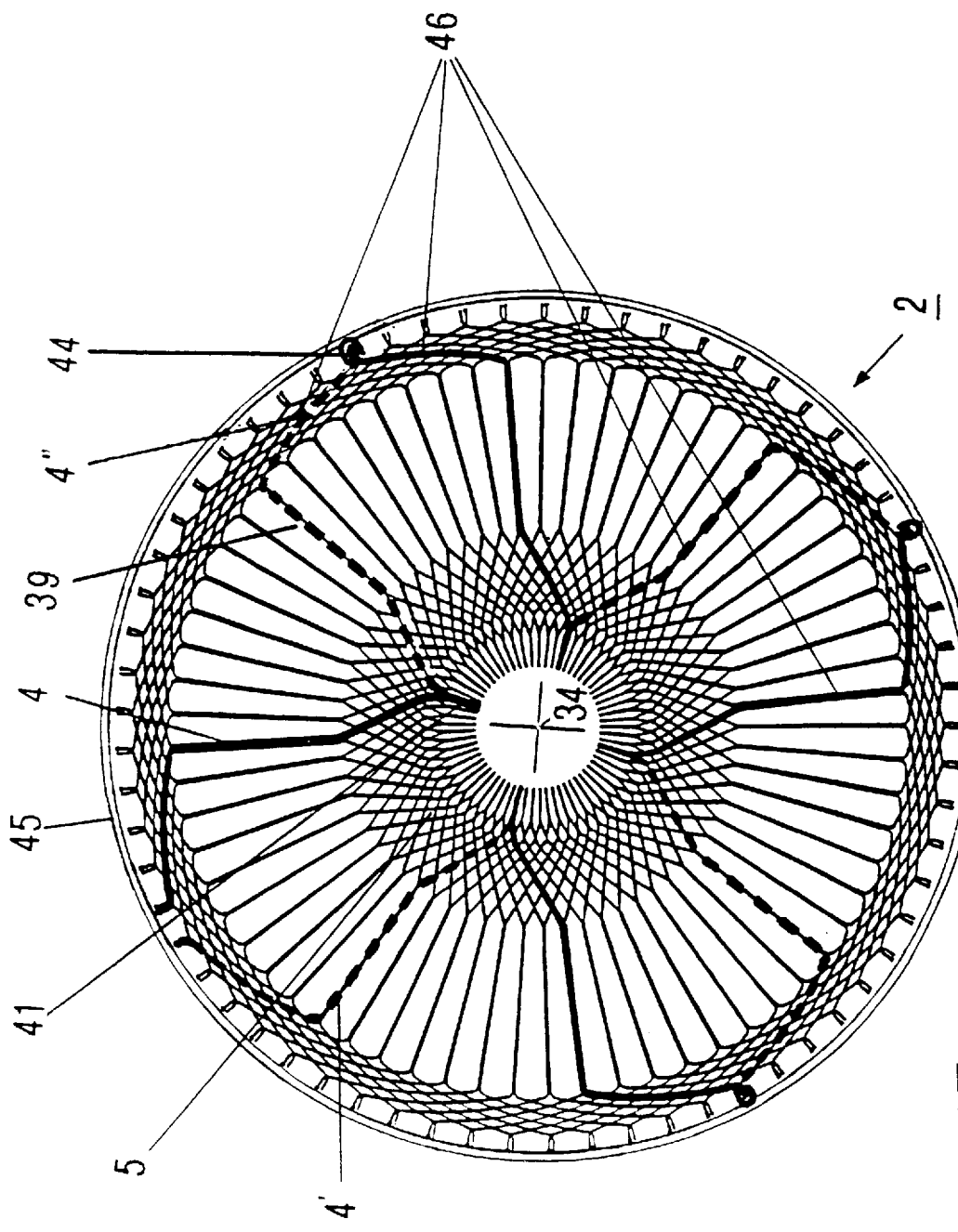
FIG. 17 illustrates a schematic view similar to FIG. 14.

FIG. 17, like FIG. 14, is a schematic view of a rotor 2, according to the present invention, as seen in the direction of the rotor axis 34. The coil elements 4, in this instance, are formed by section plates 39, which can be combined to form a group 46 along two radial planes so as to be distributed along the circumference of the rotor 2. The radially inner conductive connection, between the coil elements 4 of a group 46, is produced by the construction of two associated coil elements as one and the same section plate. The radially outer connection is effected by means of U-shaped section plates 44 beyond the two ends. The stability of this connection is also reinforced against centrifugal forces by the fiberglass strip 45.

Figure 18:
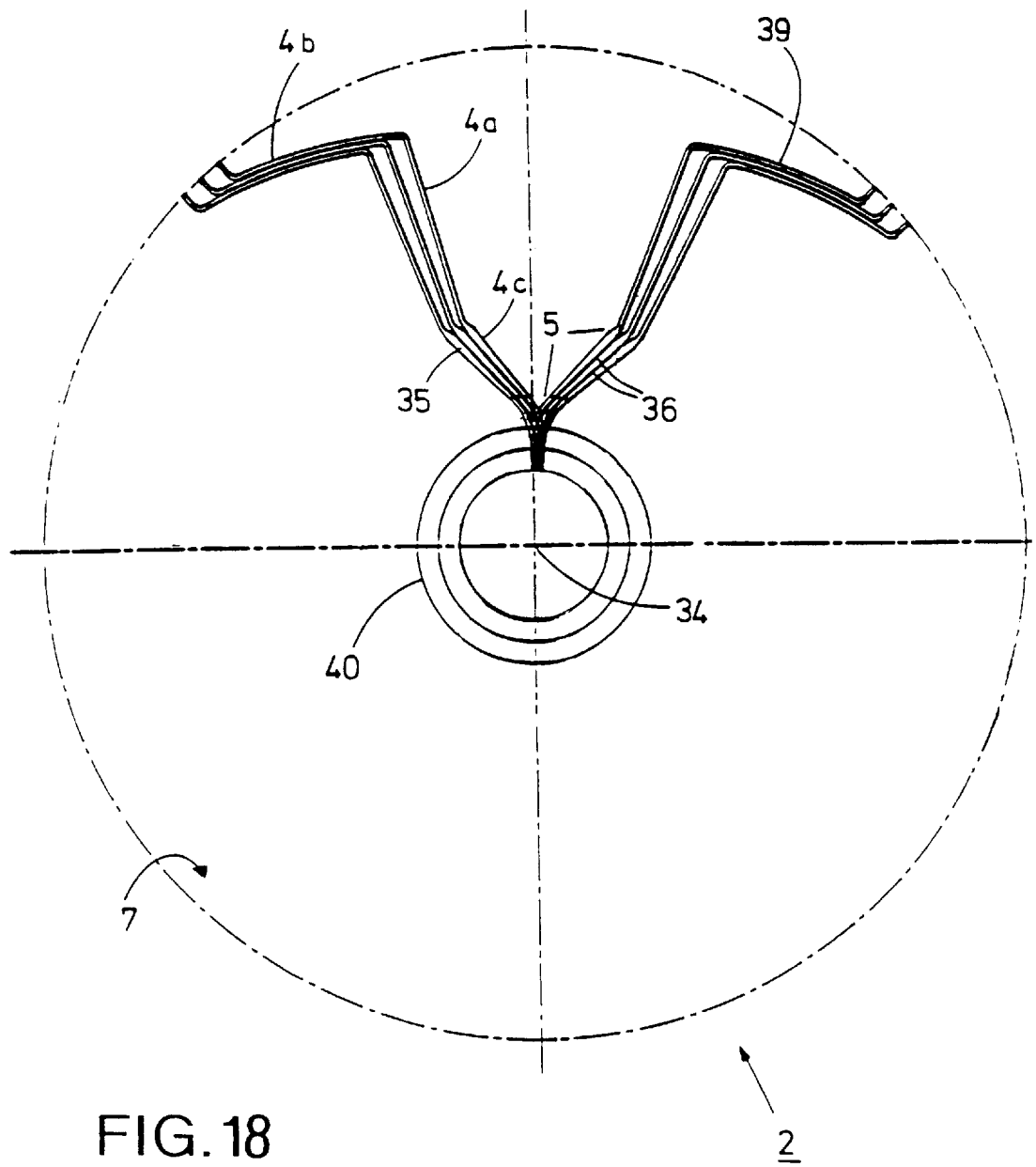
FIG. 18 illustrates another schematic view of an end face of the rotor.

In a view of three adjacent associated section element pairs, FIG. 18 illustrates how the conical surfaces 35 cooperate with their intervening insulating gaps 36 in the region of the commutator 5. Further, FIG. 18 illustrates the location of the clamping ring 40 which secures the section plates 39 in position.

FIG. 19 illustrates two associated section elements 4' and 4" as viewed vertically to the rotor axis 34. It corresponds to FIG. 15. FIG. 19 clearly illustrates the forming of two associated coil elements 4', 4" from one and the same section plate 39 whose width is split virtually along its entire length. The gap 42 separates the two rotor planes. As noted above, the radially inner connection between the associated coil elements 4', 4" is ensured by the special forming of the section plates 39. The radially outer connection is effected via U-shaped section plates 44. Further, FIG. 19 illustrates the positions of the ferromagnetic material 38 and brushes 32. The fiberglass strip 43, which is wound up in the gap 42 and which serves to secure the ferromagnetic material 38, and the fiberglass strip 45, which is intended for securing the U-shaped section plates 44, are also shown. The section plate 39 has grooves 41 at each end side 7 of the rotor, for securing purposes, but a clamping ring 40 is embedded only at the end side 7 of the rotor which is opposite the commutator 5.

FIG. 20 illustrates the initial shape of the section plates 39 which are to serve as coil elements after a corresponding bending process. The surface to be arranged, which faces the end side of the rotor, is visible. The conical surface 35 of the portion contacting the brush region is also shown. Further, the insulating layer 47, which makes contact between the section plates 39 and which separates the latter electrically, is also shown.

While the present invention has been described and illustrated in various preferred embodiments, such are merely illustrative of the present invention and are not to be construed as limitations thereof. Accordingly, the present invention encompasses all modifications, variations and alternate embodiments, with the scope of the present invention limited only by the claims which follow.

What is claimed is:

1. An electric disk armature machine, comprising:

a drive shaft;

a rotor, wherein said rotor is a self-supporting construction of a plurality of plate-like metallic coil elements which are distributed along a circumference and which are interconnected radially outside and radially inside so as to be conductive;

at least one driver disk, wherein said at least one driver disk is arranged vertically to a shaft axis for at least one of a positive and a frictional connection with said rotor; and a commutator, wherein said commutator is formed by an annular portion of one end side of said rotor;

wherein said drive shaft transmits power from and to said rotor of said electric disk armature machine, and wherein an insulating layer is arranged between said rotor and said drive shaft, and further wherein the plate-like coil element portions of said commutator have conically-shaped surfaces so that the edges of an insulating gap between every two adjacent coil element portions extend parallel to one another at least in an entire region of contact with brushes.

2. The electric disk armature machine of claim 1, wherein said insulating layer between said rotor and said drive shaft and said at least one driver disk, respectively, is made of plastic.

3. The electric disk armature machine of claim 1, wherein said insulating layer between said rotor and said drive shaft and said at least one driver disk, respectively, is made of a duroplastic.

4. The electric disk armature machine of claim 3, wherein said duroplastic is made of a fiberglass-reinforced epoxy resin mixture.

5. The electric disk armature machine of claim 1, wherein said insulating layer is connected in a positive-locking manner with said at least one driver disk via protuberances and cut out portions.

6. The electric disk armature machine of claim 1, wherein one of said at least one driver disk and said insulating layer has driver projections which engage in an end side of said rotor.

7. The electric disk armature machine of claim 6, wherein said driver projections are shaped corresponding to a configuration of portions of said coil elements in a contacting region of said end side of said rotor.

8. The electric disk armature machine of claim 1, wherein a transmission connection portion of said drive shaft has at least one groove in its circumference.

9. The electric disk armature machine of claim 8, wherein said transmission connection portion has a reduced cross section in a region of said at least one groove.

10. The electric disk armature machine of claim 9, wherein said reduced cross section corresponds at least to a depth of said groove.

11. The electric disk armature machine of claim 1, wherein only one of said at least one driver disk is rigidly connected with said drive shaft, and wherein a counterdisk is fastened on said drive shaft so as to be axially displaceable and securable opposite a surface of said at least one driver disk on a rotor side in order to produce a press fit.

12. The electric disk armature machine of claim 11, wherein said counterdisk has an internal thread and engages therewith in a corresponding external thread of said drive shaft.

13. The electric disk armature machine of claim 11, wherein said counterdisk is connected with a counterplate which covers an end of said drive shaft on said counterdisk side and a screw which projects into a central bore hole of said drive shaft and engages in an internal thread therein and which is countersunk in said counterdisk.

14. The electric disk armature machine of claim 11, wherein said counterdisk is covered by an insulating layer toward an end side of said rotor which faces it.

15. The electric disk armature machine of claim 1, further comprising:

at least one bead and one groove for securing at least one ball bearing.

16. The electric disk armature machine of claim 15, wherein a ball bearing is arranged between said counter-disk and said counterplate.

17. The electric disk armature machine of claim 16, wherein a ball bearing on said at least one driver disk side is connected with one half of a stator housing, and wherein a ball bearing on said counterdisk side is connected with a brush holder, and further wherein said brush holder is connected with the other half of said stator housing.

18. The electric disk armature machine of claim 1, wherein ferromagnetic material is arranged between radial portions of said coil elements.

19. The electric disk armature machine of claim 18, wherein said ferromagnetic material consists of dynamo sheets.

20. The electric disk armature machine of claim 1, wherein said coil elements are section plates.

21. The electric disk armature machine of claim 20, wherein said section plates are made of copper.

22. The electric disk armature machine of claim 20, wherein said section plates are held together by at least one clamping ring.

23. The electric disk armature machine of claim 22, wherein said section plates have at least one groove in the radially inner portion for receiving one of said at least one clamping ring.

24. The electric disk armature machine of claim 20, wherein said section plates are sealed with casting resin and are fixed in position relative to one another.

25. The electric disk armature machine of claim 20, wherein a body of said rotor is formed by an entirety of said section plates which are fixed in position relative to one another.

26. The electric disk armature machine of claim 18, wherein a fiberglass strip is wound one or more times around an entire circumference of said rotor in a gap between different radial planes of said coil elements so as to contact said ferromagnetic material and is sealed with casting resin.

27. The electric disk armature machine of claim 1, wherein said rotor is a disk armature of a permanently excited electric motor.

28. The electric disk armature machine of claim 1, wherein said rotor is a disk armature of a permanently excited generator.

29. The electric disk armature machine of claim 1, wherein said coil elements are one of soldered and welded on a radially outer side with the respective adjacent coil elements of a group of coil elements.

30. The electric disk armature machine of claim 20, wherein a U-shaped section plate is slid over every solder joint and is one of soldered and welded together with the latter.

31. The electric disk armature machine of claim 29, wherein a U-shaped section plate is slid over every solder joint and is one of soldered and welded together with the latter.

32. The electric disk armature machine of claim 1, wherein a fiberglass strip is wound over an entire circumference of said rotor radially outside and is sealed with casting resin.

33. The electric disk armature machine of claim 20, wherein said section plates are split in width virtually along their entire length so that every two adjacent coil elements belonging to a same group, which are connected radially inside so as to be conductive, are formed by one and the same of said section plates.

* * * * *